United States Patent Office 3,256,692
Patented June 21, 1966

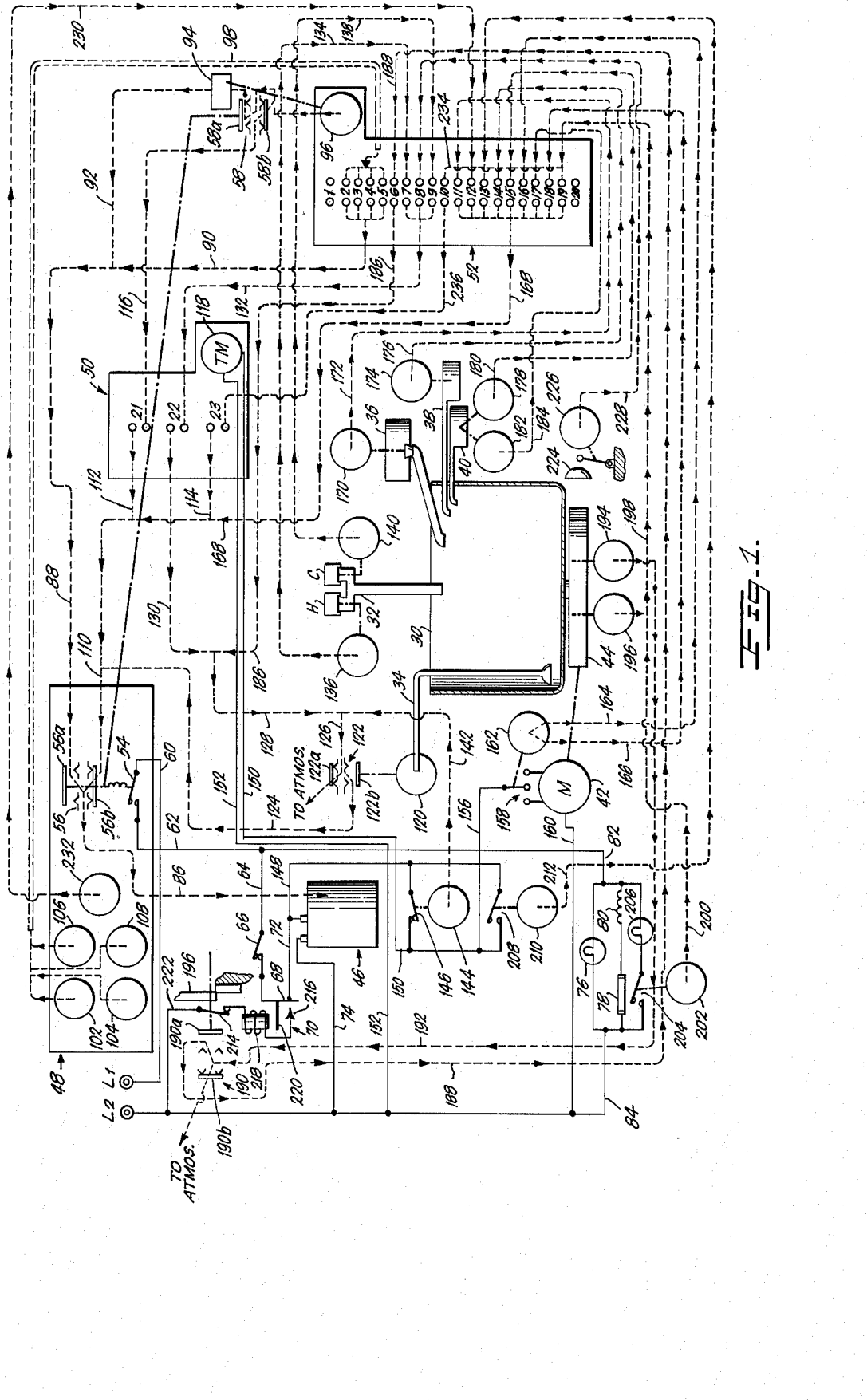

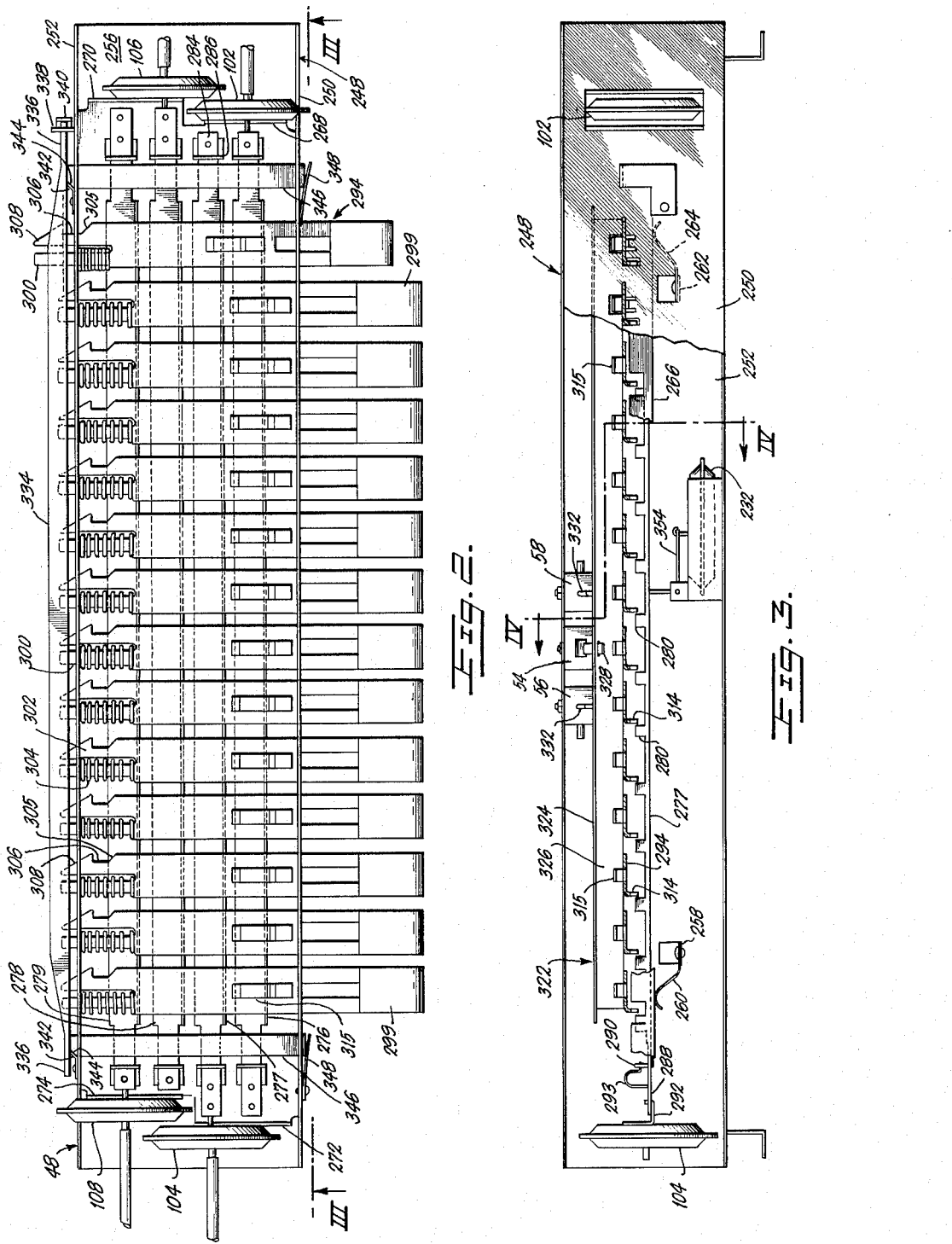

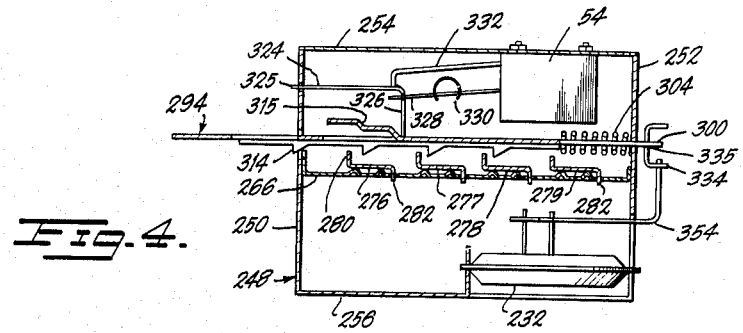
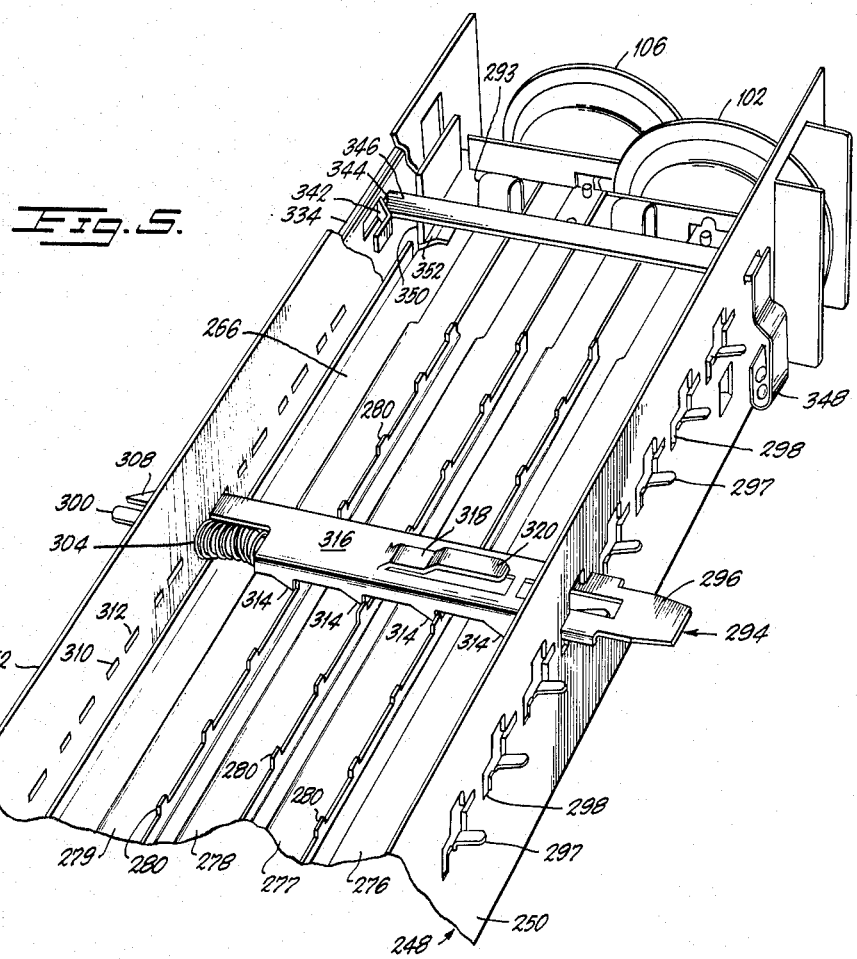

3,256,692
LAUNDRY CONTROL SYSTEM AND SELECTOR MECHANISM
Harold W. Rice, Fullerton, and Roy W. Houser, Orange, Calif., assignors to Robertshaw Controls Company, a corporation of Delaware
Filed Mar. 29, 1962, Ser. No. 178,612
11 Claims. (Cl. 60—60)

The present invention relates generally to a pneumatic control system and a selector mechanism for automatically controlling and selecting the operation and various cycles of movements associated with laundry apparatus, such as a washing machine.

The operation of a modern automatic washing machine, such as the type found in a home laundry, is controlled by sequential actuation from a plurality of control devices having different functions and being correlated in accordance with the various cycles of operation of the washing machine. The majority of modern washing machines are operated by electrical controls such as conventional solenoid operators, utilized for converting electrical energy into mechanical work. The need for a large number of such solenoid operators results in a relatively expensive control system. The use of hydraulic controls for automatic washing machines has also been found to be objectionable with regard to the space requirements and costs of the hydraulic valves necessary for such an operation. Some attempts have also been made to utilize pneumatic control systems in automatic washing machines, but such systems have required the use of control devices actuated by means of pressure or by means of a combination of pressure and vacuum; the cost of supplying a pressure pump finds no economic advantage over electrical systems and the valve operation for controlling the pressurized flow has met with the same objections as with the electrical control system and its solenoids.

It is, therefore, an object of this invention to overcome the above objections by means of a pneumatic control system for automatic washing machines.

Another object of this invention is to sequentially control the operation of automatic control devices by vacuum means.

Another object of this invention is to control laundry apparatus by a pneumatic system utilizing a source of vacuum operating on a non-bleed principle.

This invention has another object in that an improved selector mechanism is utilized to predetermine an operating cycle for a pneumatic control system.

Another object of this invention is to release a plurality of inadvertently depressed push buttons in a selector mechanism by a simple depression of any one of such push buttons.

This invention has another object in that each push button of a selector mechanism cooperates with a latching bar to clear previous or inadvertent selections.

It is another object of this invention to actuate an electric switch simultaneously with the selection of a sequence of operation of a pneumatic control system by means of a push button mechanism.

A further object of this invention is to combine pneumatic actuator means with a selector mechanism.

In the preferred embodiment of the invention, a pneumatic control system utilizes a plurality of pressure responsive actuators associated with the control devices of an automatic washing machine. The pneumatic control system takes the form of a non-bleed vacuum system so that whenever one side of the diaphragm of a pressure responsive actuator was exposed to a source partial vacuum, the atmospheric pressure on the other side of the diaphragm would move it from an initial position. Conversely, upon disconnection of the diaphragm from the vacuum source and exposure of both sides thereof to atmospheric pressure, the diaphragm would be returned to its initial position. Such an arrangement requires only a very small vacuum pump to supply a source of vacuum. Operation of the pneumatic control system is initiated by a selector mechanism which includes a plurality of push buttons for actuating a carriage assembly consisting of a plurality of slidable bars. A similar plurality of diaphragm actuators are disposed adjacent the ends of such bars and are operatively connected to the pneumatic control system. The initial movement of the push button lever cams a latch bar in a linear direction and in cooperation with cam bars causes the carriage assembly to move out of engagement with the push button lever whereby a cancellation of improperly selected cycles is effected.

Additional features and advantages of the present invention will become apparent from the following description of a preferred embodiment taken in connection with the accompanying drawings wherein:

FIGURE 1 is a schematic diagram of a pneumatic control system embodying this invention as applied to a washing machine;

FIG. 2 is a plan view of a push button selector mechanism with the top removed;

FIG. 3 is a section taken along line III—III of FIG. 2 with parts broken away;

FIG. 4 is a sectional view taken along line IV—IV of FIG. 3; and

FIG. 5 is a partial isometric view of FIG. 2, with parts removed.

Referring first to FIG. 1, there is shown a control system for a washing machine schematically illustrated as including a tub 30, water filling means 32 which may take the form of a mixing valve for supplying a mixture of hot and cold water to the tub 30 and a water level control 34. A plurality of dispensing mechanisms are included in accordance with the particular installation, e.g., a bleach dispenser 36, a water conditioner dispenser 38, and a detergent dispenser 40 are associated with the tub 30.

A two-speed electric motor 42 is operatively connected to a suitable gear mechanism 44 for rotating the tub 30 at either of two speeds and for operating the agitator (not shown) at either of two speeds.

The components of the pneumatic control system include a vacuum pump 46, a selector mechanism 48, a timer 50, and a programmer 52, each of which will be more fully described hereinafter. In the schematic diagram of FIG. 1, the electrical circuits or conductors are shown in solid lines, the pneumatic circuits are shown as a series of short dashes with arrowheads indicating the direction of vacuum from the pneumatic actuators to a vacuum pump, and the mechanical connections are represented by the dash-dot lines.

Upon selection of a washing machine cycle, the selector mechanism 48 closes a normally open electrical master switch 54 and actuates a pair of pneumatic control valves 56 and 58 such that their valve members 56a and 58a are moved to their flow permitting positions and valve members 56b and 58b are moved to their flow preventing positions. Closure of the master switch 54 completes a circuit for the operating motor of the vacuum pump 46 as traced from $L_1$ through conductor 60, switch 54, conductor 62, conductor 64, holding switch 66, removable contact 68 of a kick-out switch 70, conductor 72, the vacuum pump 46, and conductor 74 to line $L_2$. The closure of the master switch 54 also energizes an indicator lamp 76 and a fluorescent light 78 having electrical ballast means 80 through a circuit including conductors 82 and 84.

Energization of the vacuum pump 46 establishes a partial vacuum which is transmitted through conduit 86, the open valve member 56a, conduit 88 and conduit 90 to the programmer ports 2, 3, 4 and 5. At the same time, a parallel pneumatic circuit is applied thorugh conduit 92 and pneumatic valve mechanism 94 to a pneumatic actuator 96 associated with the programmer 52. The pneumatic valve mechanism 94 includes a valve means whereby the program actuator 96 may be exposed to either the vacuum from the conduit 92 for operation to a given position or to atmospheric pressure for return to its original position. The valve mechanism 94 is also physically connected to the program actuator 96 whereby the latter controls the operation of the former; i.e., the program actuator 96 moves from its original position to a second position under the influence of the partial vacuum, which movement in turn causes the valves of the valve mechanism 94 to expose the program actuator 96 to atmospheric pressure. The diaphragm of the program actuator 96 consequently returns to its original position, which movement alters the valves of the valve mechanism 94 such that the program actuator 96 is again exposed to the partial vacuum. In this manner, the program actuator 96 is caused to "chase itself" so as to rapidly step or advance the programming valve or endless belt.

The rapid advancing of the programmer belt continues until it reaches such a position corresponding to the cycle selected by the selector mechanism 48. The selected cycle effects the arrival of the proper combination of channel means and exhaust ports on the programmer belt at the programmer ports 2, 3, 4 and 5, whereupon the programmer belt is in the proper position for the start of the selected cycle. The pneumatic circuit from the programmer ports 2, 3, 4 and 5 may be traced through a conduit 98 which represents in the schematic the four separate conduits leading to pneumatic actuators 102, 104, 106 and 108 associated with the selector mechanism 48.

The programmer 52 includes a reading head having a plurality of pairs of ports and while twenty pairs of ports are shown, it is to be understood that the actual number may be varied in accordance with different types of controls for different types of washing machines. The pairs of ports, numbered 1 through 20, are part of the various pneumatic circuits and a pneumatic flow between each pair of ports is controlled by an endless belt (not shown) for actuation of the various pressure operated actuators in a predetermined sequence. The endless belt includes exhaust openings and channel means which establishes communication between each pair of ports by movement across the reading head; the channel means are arranged on the belt in a predetermined sequence to program the operation of the washing machine.

The timer mechanism 50 is operated by an electrical timer motor TM and comprises a reading head having three pairs of ports 21, 22 and 23 which are controlled by an endless belt driven by the timer motor TM in the same manner as provided in the belt of the programmer 52.

As will be described more fully hereinafter, the selector mechanism 48 includes a push button arrangement which upon release by an operator does not affect the position of the master switch 54 but does transfer the valves 56 and 58 so that valve members 56a and 58a are closed and valve members 56b and 58b are open. The closure of valve member 56a disconnects the vacuum pump 46 from the pneumatic conduit 88; the vacuum is thus removed from the programmer ports 2, 3, 4 and 5 by the pneumatic circuit including the conduit 90 and by the parallel pneumatic circuit including the conduit 92, the vacuum is removed from the valve mechanism 94 which is no longer operable to energize and deenergize the programmer operator 96.

The opening of the valve member 56b makes a partial vacuum available to the timer mechanism 50 by means of the conduit 110 and a pair of parallel pneumatic circuits, the first including conduit 112 leading to the parts 21 and the second including the pneumatic conduit 114 leading to the timer ports 23. Inasmuch as the valve member 58b is also open, the programmer actuator 96 is now under the control of the endless belt of the timer mechanism 50 through the pneumatic circuit traced from the program actuator 96, the conduit leading therefrom through the valve member 58b and the conduit 116 to the timer port 21. At this point, the timer endless belt is stationary inasmuch as the timer motor 118 is unenergized until the tub 30 is filled with water. However, the valving belt for the timer mechanism 50 is in its start position wherein the channel means spans the pairs of ports 21, 22 and 23 until the timer motor 118 is energized. The filling of the tub 30 to a proper level of water is controlled by the water level control device 34 which causes its pneumatic actuator 120 to actuate the pneumatic flow valve 122 including its valve members 122a and 122b. A pneumatic circuit for the water filling operation may be traced from the pneumatic conduit 110, the conduit 124, the valve member 122b, the conduit 126, the conduit 128, the conduit 130, the timer ports 22, and the conduit 132 leading from the programmer ports 7, 8 and 9. The programmer ports 7 and 9 are connected to operate the water mixing valve 32 with port 7 connected to pneumatic conduit 134 leading from the pneumatic actuator 136 which controls the flow of hot water and with the port 9 being connected to the conduit 138 which leads from the pneumatic actuator 140 controlling the flow of cold water. With such an arrangement, the temperature of the water admitted to the tub 30 is predetermined by the programmer belt while it is in its initial start position for the particular cycle selected.

When the tub 30 is filled with water to a predetermined level, the actuator 120 moves the valve mechanism 122 so that valve member 122a is in an open position and valve member 122b is in a closed position. This exposes the pneumatic conduit 126 to the atmosphere thus interrupting the vacuum on the water mixing actuators 136 and 140 to shut off the flow of water into the tub 30; at the same time, a parallel pneumatic circuit including conduit 142 leading from the conduit 126 to a pneumatic actuator 144 which causes an electrical switch 146 to return to its normally closed position. Closure of the switch 146 completes an electrical circuit for the timer motor 118, which may be traced in a parallel circuit from the conductor 72 through the conductor 148, the electrical switch 146, the conductor 150, the timer motor 118, and the conductor 152 to the line $L_2$.

The closure of the electrical switch 146 also completes an electrical circuit for the washing machine motor 42, which may be traced in a parallel circuit from the switch 146 through a conductor 154, conductor 156, the high or low contact of a single pole double throw electrical switch 158, the main motor 42 and a conductor 160 to line $L_2$. The speed of the main motor 42 has been previously determined in accordance with the cycle selected by movement of the high-low switch 158 by the pneumatic actuator 162. In this respect, the speed of the main motor 42 is determined by the programmer belt in its start position which alternately controls the pair of ports 16 or the pair of ports 18. Thus, the pneumatic actuator 162 moves the double throw switch 158 to either its high or low position by a pneumatic circuit traced from the pneumatic actuator 162 through the pneumatic conduit 164 or the conduit 166 leading to the pairs of ports 16 or 18, respectively. The pairs of ports 16 and 18 together with all the pairs of ports numbered 11 through 19, are connected to the source of vacuum by means of a common conduit 168 which connects to the conduit 110.

In accordance with the controlling means on the endless belt of the programmer 52, the bleach dispenser 36, the water conditioner dispenser 38, and the detergent dispenser 40 will be actuated for a predetermined time. A pneumatic circuit for the bleach dispenser 36 may be traced from a pneumatic actuator 170 through a pneumatic conduit 172 to the programmer port 11. A pneumatic circuit for the water conditioner dispenser 38 may be traced from a pneumatic actuator 174 and through a pneumatic conduit 176 to the programmer port 14. A pneumatic circuit for the detergent dispenser 40 may be traced from a pneumatic actuator 178 and through a pneumatic conduit 180 to the programmer port 15; the detergent dispenser 40 may be additionally actuated to supply an additional amount of detergent to the tub 30 by a second pneumatic circuit traced from a pneumatic actuator 182 and through a conduit 184 to the programmer port 17.

After the initial operation of the washing machine as described above, the majority of the functions are controlled by the endless belt of the programmer 52 except for those functions which cannot be commenced and terminated at one of the two-minute steps of the endless belt; these latter functions are controlled by the continuously moving endless belt of the timer mechanism 50. In this respect, the spin cycle of the washing machine is under the control of the pair of ports 6 of the programmer 52 which is connected to a vacuum source by a pneumatic circuit traced from the conduit 110, through the conduit 124, the valve member 122b, the conduit 126, the conduit 128, and the conduit 186 leading to the lefthand programmer port 6. The righthand programmer port 6 is connected to a conduit 188 which completes a pneumatic flow through the open valve member 190a of a switch 190 and through a pneumatic conduit 192 leading to a pneumatic actuator 194 which actuates the gear mechanism 44 for a spinning operation. The movement of the switch 190 closes its valve member 190b and prevents the conduit 192 from being vented to the atmosphere. The switch 190 is actuated in accordance with the movement of the lid of the washing machine so as to constitute an interlock whereby the spinning operation is prevented from occurring whenever the lid 196 of a washing machine is opened. It should also be noted that the pneumatic circuit from the vacuum pump 46 to the pneumatic actuator 194 for a spinning operation includes the pneumatic flow switch 122 that interrupts the vacuum when the tub 30 is filled with water. With this arrangement, the drain pump (not shown) which is operated by the main motor 42 must drain for a period of time before the spin operation can be commenced and thus prevents the main motor 42 from trying to effect a fast spin action when the load is very heavy.

A pneumatic circuit for an agitation operation may be traced from a pneumatic actuator 196, suitably connected to the gear mechanism 44, through a conduit 198 to the programmer port 19. By means of a pneumatic conduit 200, a pneumatic actuator 202 is in parallel with the agitator actuator 196 to close a normally open switch 204 which completes a circuit for an indicator light 206 connected in series between electrical connectors 82 and 84. Thus, whenever the agitator actuator 196 is energized, so is the switch actuator 202 causing energization of the indicator light 206 so that the housewife will have an indication that the agitation operation is in process.

As described above, the main motor 42 and the timer motor 118 are electrically controlled by the switch 146. However, the switch 146 is subject to the water level control valve 122 and there are times when the water level will be low, such as during a draining operation. To permit the energization of main motor 42 and the timer motor 118, an electrical switch 208 bypasses the water level responsive switch 146. The normally open bypass switch 208 is moved to a closed position by means of a pneumatic actuator 210 whose pneumatic circuit may be traced through a conduit 212 to the programmer ports 13.

Also connected to the lid 196 of the washing machine is an electrical switch 214 which permits the kick-out switch 70 to return to its original position as shown in FIG. 1 whenever the washer lid is opened. For example, an unevenly distributed load in the tub 30 which would be dangerous to the equipment or the operator, causes the movable contact 68 to move out of engagement with the conductor 72 and into engagement with the stationary contact 216. This opens the electrical circuit for the vacuum pump 46 and deenergizes virtually the entire control apparatus by removal of both the vacuum source and the electrical source. When the movable contact 68 engages the stationary contact 216 it energizes the electromagnet winding 218 through the red switch, whereupon the armature 220 of the switch 70 holds the movable contact 68 in engagement with the stationary contact 216. The circuit for energizing the electromagnet coil 218 which is the only circuit which is energized at this time, may be traced from line $L_1$ through the conductor 60, the master switch 54, the conductor 62, the conductor 64, the normally closed switch 66, the movable contact 68, the stationary contact 216, the coil 218, the electrical switch 214 and the conductor 222 leading to line $L_2$. When the lid 196 is opened by the operator to rearrange the uneven load, electrical switch 214 is opened causing the winding 218 to be energized and permitting the movable contact 68 to return to its position as shown in FIG. 1. As soon as the washer lid 196 is again closed, the normal operation of the washing machine will be resumed. The normally closed electrical switch 66 enables the operator or housewife to stop the cycle of operation for any desired purpose such as adding more clothes to the tub 30. The switch 66 is manually operable when opened, deenergizes all of the electrical circuits other than those to the main indicator light 76 and the fluorescent light 78. Upon manual reclosing of the electrical switch 66, the operation of the washing machine will be resumed from the point of interruption.

During the last two-minute interval of each cycle, channel means on the endless belt of the programmer 52 are arranged to span and permit a pneumatic flow between the pair of programmer ports 8. Such channel means are spaced on the endless belt to provide an intermittent audible signal. To this end, a bell 224 is sounded by a pneumatic actuator 226 which is intermittently energized and deenergized during the final two-minute interval of the cycle. The pneumatic actuator 226 is actuated by a pneumatic circuit traced therefrom through a conduit 228, the pneumatic ports 8, the conduit 132, the timer ports 22, the conduit 130, the conduit 128, the conduit 126, the open valve member 122b, the conduit 124, the conduit 110, the open valve member 56b and the conduit 86 to the vacuum pump 46. The audible signal is provided to give an indication that the end of the cycle is at hand.

The cycle is terminated by the last movement of the endless belt of the programmer 52 which interrupts the pneumatic flow through the ports 8 to cut off the audible signal and provides channel means for spanning the ports 12. A pneumatic flow through the ports 12 is traced through a pneumatic conduit 230 leading from a pneumatic actuator 232 which is associated with the selector mechanism 48 for terminating the operation of the washing machine. As will be described more fully hereinafter, the pneumatic actuator 232 returns a previous selected push button to its off position which thus returns the master switch 54 to its circuit open position and thereby removes electrical power from the entire control apparatus.

It is to be noted that ports 7 and 9 of the programmer 52 which control the hot and cold water actuators of the mixing valve 32 are also subject to the control of ports 22 in the timing mechanism 50. Such an arrangement provides a spray rinse, at the appropriate temperature, as determined by the endless belt of the timing mechanism 50; i.e., at the appropriate point or points in a given cycle the endless belt of the programmer 52 will connect the programmer ports 7 and 9 and then the endless belt of the timing mechanism 50 will control the rate of operation of the actuators 136 and 140 to effect the desired intermittent spray rinse.

With regard to the programmer 52, it is to be noted that the right hand port 10 of the programmer reading head is connected by a suitable conduit 234 to the right hand port 19 which controls the operation of the agitation actuator 196. Such an arrangement provides an alternate parallel control for the agitation operation for a special predetermined cycle, as for example in washing blankets. During this time a pneumatic circuit for the agitator actuator 196 may be traced therefrom through the pneumatic conduit 198, the conduit 234, the programmer ports 10, and the conduit 236 to the ports 23 and the timer mechanism 50. In this manner the unique agitation cycle is controlled by the endless belt of the timer mechanism 50 for a predetermined length of time and for intermittent operation, as for example 15 seconds followed by a period of 45 seconds of inoperation. This sequence is continued for a predetermined length of time during which the pneumatic actuator 162 moves the switch 158 to a low position whereby the main motor 42 is operated at a low speed and the agitation in the tub 30 takes place at a slow rate of speed to prevent damage to the blanket.

Referring now to FIGS. 2 through 5 of the drawing, there is represented a particular selector mechanism for selecting the various washing machine operating cycles by means of push buttons. The selector mechanism 48 includes a generally rectangular hollow frame member 248 having front and rear walls, 250 and 252, joined by top and bottom walls, 254 and 256, and closed by suitable end walls (not shown). The rear wall 252 has a pair of bent-in tangs, each of which is located slightly inwardly from its end, to form spaced supporting shoulders 258 (only one being shown) to which leaf springs 260 are respectively secured as by rivets; a pair of similar spaced supporting shoulders 262 and leaf springs 264 (only one being shown) are bent out of the front wall 250 to form a symmetrical pattern of four resilient supporting surfaces.

The two pairs of resilient springs 260 and 264 present a yieldable mounting for a carriage assembly which includes a generally rectangular carriage plate 266 having a dimension to fit in the rectangular frame member 248. Each end of carriage plate 266 is bent upwardly as viewed in FIG. 2 to present mounting flanges 268 and 270 on one end and similar mounting flanges 272 and 274 on the opposite end. The mounting flanges 268 and 270 are offset from each other and are secured to the pneumatic actuators 102 and 106 respectively, as by welding the actuator housing to its corresponding flange; similarly, the flanges 272 and 274 are offset and welded to the housing of pneumatic actuators 104 and 108, respectively.

As is illustrated in FIG. 4, the carriage plate 266 is provided with coin nodes on which four actuating bars 276, 277, 278, and 279 are slidably positioned for longitudinal movement relative to the carriage plate 266. Each actuating bar is a generally flat elongated strip, the opposite edges of which are provided with spaced upwardly bent fingers 280 and spaced downwardly bent fingers 282, respectively. The downwardly bent fingers 282 extend through suitable slots in the carriage plate 266, one slot for each actuating bar, in order to stabilize the actuating bars during longitudinal movement. The actuating bar 277 has a free end 284 extending through a slotted flange 286 bent perpendicularly upwardly from the carriage plate 266. The opposite end 288 extends through a similarly slotted flange 290 and is connected by means of a link 292 to the movable diaphragm (not shown) of the pneumatic actuator 104; a U-shaped spring 293 is mounted in compression between the flange 290 and a portion of the bar end 288 to cause return of the actuating bar 277 to an initial position whenever the pneumatic actuator 104 is exhausted to the atmosphere by the programmer mechanism 52. Inasmuch as the other actuating bars 276, 278 and 279 are connected to their respective pneumatic actuators in an identical manner, the above description of the one connection will also apply to the others.

Arranged along the top of the actuating bars 276, 277, 278 and 279 are a plurality of push buttons which in this instance number fourteen (FIG. 2) to represent the fourteen cycles to be performed by the laundry apparatus. Since the push buttons are identical, only one will be described in detail. As best shown in FIG. 5, the push button, indicated generally at 294, is supported by the frame member 248 and has a button receiving front end 296 extending through a slot 298 in the front wall 250; the slot 298 has the same configuration of the cross section of the push button 294 to permit assembly through the front wall 250. After such assembly, a tab 297 on the front wall 250 is bent upwardly toward an aligned slot in the central portion of push button 294 for cooperation with each end of such slot to limit the inward and outward movement of the push button 294. The rear end of push button 294 is bifurcated into a spring retainer portion 300 and a latching portion 302. A coil spring 304 loosely fits over the retainer portion 300 and is interposed between the rear wall 252 and the edge of the central portion of the push button 294. The latching portion 302 is formed on the side edge of the push button 294 and comprises an inner camming surface 305, a notched portion 306 and an outer camming surface 308 tapering to a terminal point. The bifurcated end of push button 294 is slidably supported by the rear wall 252 that is provided with a pair of slots 310 and 312 through which the spring retainer portion 300 and the latching portion 302 respectively extend.

Along its central portion one side edge of push button 294 is provided with four spaced tabs 314, one for each actuating bar 276, 277, 278 and 279. The tabs 314 are disposed downwardly from the plane of the push button 294 to cooperate with the upstanding fingers 280 on the actuating bars for a purpose to be described hereinafter. The push button 294 is provided with a three-step cam surface 315, the first step 316 defined by the top surface of the central portion from which an upwardly struck tab forms a sloping surface leading to the second step 318 followed by another sloping surface leading to the third step 320. For cooperation with the cam surface 315, an actuator plate 322 is pivotally carried by the front wall 250. The actuator plate 322 has a length sufficient to span the entire fourteen push buttons 294 and is a general angle bar cross section with a horizontal leg 324 which is pivotally mounted at its end portions to the front wall 250 as by ears 325 extending through suitable apertures therein and with a vertical leg 326 extending into engagement with the cam surfaces 315 of all the push buttons 294.

As is illustrated in FIG. 4, the actuator plate 322 cooperates with the main switch 54 by means of a lost motion connection in the form of a switch operating blade 328 and an overcenter U-shaped spring 330. Depression of a push button 294 moves the actuator plate leg 326 upwardly but must be almost completely depressed before the overcenter mechanism snaps the circuit contact in switch 54 to an ON position. In a similar manner, the overcenter mechanism holds the switch 54 in a closed position until the push button completely returns to its retracted position wherein the vertical leg 326 engages the first step surface 316. Thus, there is no operation of switch 54 upon return movement of the push button 294 from its fully depressed position to its intermediate position. The actuator plate 322 also cooperates with the pneumatic flow control valves 56 and 58, each of which has a valve operating bar 332 operatively engaging the horizontal leg 324 for movement thereby.

On the exterior of rear wall 252 a latch bar 334 is mounted for longitudinal movement relative to the frame member 248. The latch bar 334 has a generally U- shaped cross section and flat end tabs 336 which slidably extend through slotted tangs 338 (only one tang being shown in FIG. 2) which are struck perpendicularly from the rear wall 252. The central part of latch bar 334 has fourteen elongated slots 335, corresponding to the fourteen push buttons 294, each of the slots being of sufficient size to receive the ends of the push button retainer portion 300 and latching portion 302. Initial depression of the push button 294 causes its cam surface 308 to move the latch bar 334 to the right as viewed in FIG. 2 against the biasing force of a leaf spring 340 mounted on the slotted tang 338. When the push button 294 is fully depressed, spring 340 returns the latch bar 334 to the left and the edge of slot 335 is moved into the notched portion 306 whereby the push button is latched in an intermediate position.

Adjacent each end tab 336, the central part of latch bar 334 has a punched out portion defining a camming surface 342 as shown in FIGS. 2 and 5. Each camming surface 342 engages a similarly sloped edge 344 on the end of a carriage depressing bar 346 which is slidably supported by extending through aligned slots in the front and rear walls 250 and 252. With such an arrangement, the rightward movement of the latch bar 334 causes its two camming surfaces 342 to cam the edges 344 and move the carriage depressing bars 346 toward the front wall 250 against the bias of return leaf springs 348 fixed to the exterior of front wall 250. Each carriage depressing bar 346 is provided with a pair of downwardly extending lugs 350 (only one being shown in FIG. 5), which are spaced inwardly from the opposite ends of the bar 346 so as to be disposed inside the front and rear walls 250 and 252. The bottom edge of each lug 350 engages a cam surface 352 formed on the carriage plate 266 so that forward movement of the carriage depressing bar 346 by the latch bar 334 causes the entire carriage assembly to be depressed or moved downwardly against the bias of the carriage plate supporting springs 260 and 264.

It is now apparent that each push button 294 is provided with three distinct positions, namely, fully retracted, intermediate and fully depressed, corresponding to the three step cam surfaces 316, 318 and 320, respectively. With regard to the schematic diagram of FIG. 1, the fully retracted position corresponds to the OFF position of the entire control system; the fully depressed position corresponds to the searching position wherein the programmer valve is being advanced at a rapid rate to the starting point of the selected cycle; and, the intermediate position corresponds to the operating position of the selected cycle. When any one of the push buttons 294 is fully depressed, the actuator plate 322 is in engagement with the top level cam surface 320 whereby the main switch 54 is closed, the pneumatic valve members 56a and 58a are moved to flow permitting positions and the valve members 56b and 58b are moved to flow preventing positions. Upon release of the selected push button 294 to its intermediate position, the main switch 54 is retained in its closed position but valve members 56a and 58a are closed and valve members 56b and 58b are opened.

During the searching operation, the cycle is selected by a code combination on the programmer valve in cooperation with the pneumatic actuators 102, 104, 106 and 108 which are actuated singly or in combination to assure that the proper starting point on the programmer valve corresponds to the push button selection. The four actuating bars 276, 277, 278 and 279 are thus positioned by their respective pneumatic actuators so that the latching fingers 280 will engage one or more of the tabs 314 and latch the push button 294 in its fully depressed position until the searching operation is completed.

Initial depression of the push button 294 causes its camming surface 308 to move the latch bar 334 to the right so that any other push button, which might have its notched portion 306 in engagement with the latch bar 334, is released for return to its fully retracted position. Thus, if any one of the push buttons is partially depressed while the control system is deenergized or if the housewife decides to select a different wash cycle while the first cycle is operating, the initial depression will correct any type of inadvertent selection. Inasmuch as the rightward movement of the latch bar actuates the carriage depressing bars 346, the resulting downward movement of the four actuating bars 276, 277, 278 and 279 disengages the fingers 280 from the push button tabs 314 and thus releases all push buttons which might be hung up in the search position. With such an arrangement, the initial depression of the push button 294 clears the selection mechanism by movement of the latch bar 334.

The continued depression of the push button 294 to its fully depressed position locates the notched portion 306 in alignment with the latch bar 334 which is returned to the left by the spring 340. At this time the notched portion 306 does not engage the latch bar 334 even after the push button 294 is no longer held by the housewife because then the latching fingers 280 on the actuating bars engage the tabs 314 and keeps the push button 294 in its fully depressed position. This position of the push button 294 is shown in FIG. 5 which represents the searching position.

Upon completion of the searching operation, the actuating bars 276, 277, 278 and 279 are shifted by selective actuation of the pneumatic actuators 102, 104, 106 and 108 whereupon the latching fingers 280 are disengaged from the tabs 314 and the selected push button is returned by its coil spring 304 to the intermediate position. FIG. 2 represents the intermediate portion wherein the notched portion 306 engages the latch bar 334 to retain the push button 294 in its intermediate position until the end of the cycle.

The pneumatic actuator 232 is secured to the bottom wall 256 of the frame 248 and its diaphragm stem is operatively connected to the latch bar 334 by means of a bell crank or lever 354. The pneumatic actuator 232 serves as a terminating means and is actuated in accordance with a predetermined pneumatic flow through the programmer 52; the movement of the diaphragm stem pivots the lever 354 which in turn moves the latch bar 334 to the right against the bias of its return spring 340. The latch bar movement releases the notched portion 306 and the push button 294 is returned to its fully retracted position whereupon the switch and valve actuator plate 322 is pivoted out of engagement with the intermediate surface 318 and into engagement with the lowest surface 316 of the three-step cam. Thus, the main switch 54 is opened to deenergize the entire control system and the pneumatic valves 56 and 58 remain in the same positions they were in while the push button 294 was in its intermediate position.

In the event all of the push buttons 294 have been inadvertently depressed sufficiently for all the notched portions 306 to be engaged with the latch bar 334, the entire mechanism may be cleared by merely further depressing any one of the push buttons 294 to cause its camming surface 305 to move the latch bar 334 to the right. This clearing action is effected by the resulting release of all the other push buttons from the latch bar 334 and the depression of the carriage plate assembly to free the push button tabs 314 from the actuating bar fingers 280.

It should be noted the selection mechanism operates on the principles of Boolian algebra whereby a particular combination or position of the four pneumatic actuators 102, 104, 106 and 108 determines the position of the belt valve to be read on the programmer 52. These four pneumatic actuators, in operation, control the position of the four actuating bars 276, 277, 278 and 279 which may be designated as Boolian bars. When a button is depressed on the push button unit, the operator is in effect determining the combination necessary to position the belt valve of the programmer at a starting point.

Inasmuch as the present invention is subject to a wide variety of modifications and changes in details, it is intended that all matter contained in the foregoing description and shown on the drawing shall be interpreted as illustrative and not in a limiting sense.

What is claimed is:

1. In a pneumatic control system for laundry apparatus, the combination comprising a source of vacuum, a plurality of vacuum operated actuators adapted to be operated in a predetermined sequence for controlling the laundry apparatus in accordance with a selected cycle of operation, programmer means controlling vacuum flow between said source and said actuators, a selector mechanism operatively connected to said programmer means for actuating the same in accordance with a selected cycle and including pneumatic valve means directly communicating with said vacuum source for initiating operation of said programmer means, a plurality of push buttons and an operative connection between each push button and said pneumatic valve means.

2. In a pneumatic and electric control system for laundry apparatus, the combination comprising an electrically driven vacuum pump, a plurality of control actuators operable between controlling positions when subject to vacuum from said pump, programmer means controlling vacuum flow between said vacuum pump and said actuators, a selector mechanism operatively connected to said programmer means for actuating the same in accordance with a selected cycle and including pneumatic valve means directly communicating with said vacuum pump for initiating operation of said programmer means, and master switch means simultaneously operable with said pneumatic valve means for energizing said vacuum pump.

3. In a selector mechanism for laundry apparatus, the combination comprising a supporting frame member, a carriage assembly movably mounted on said frame member, push button means on said frame member, a plurality of bar elements mounted on said carriage assembly for slidable movement between positions, interengaging means between said push button means and said bar elements for holding said push button means in a predetermined position, and means operably connected to said push button means for releasing said interengaging means.

4. The combination as recited in claim 3 wherein said interengaging means comprises a plurality of depending tabs on said push button means and a plurality of latching fingers on said bar elements.

5. The combination as recited in claim 3 wherein said releasing means includes latching means operated by said push button means and disposed to retain said push button means in another predetermined position.

6. In a selector mechanism for laundry apparatus, the combination comprising a supporting frame member, a carriage assembly movably mounted on said frame member, push button means on said frame member and movable between a retracted position, an intermediate position and a depressed position, actuating bars carried by said carriage assembly for slidable movement, interengaging means between said push button means and said actuating bars for retaining said push button means in the depressed position, latching bar means carried by said frame member and retaining said push button means in the intermediate position, said latching bar means being operative to release said push button means from the intermediate position to the retracted position, and carriage depressing means operatively connected between said carriage assembly and said latching bar means whereby said interengaging means is released by operation of said latching means.

7. The combination as recited in claim 6 wherein pneumatic actuated means is operatively connected to said latching means for operating the same.

8. In a selector mechanism for selectively controlling electric and pneumatic circuits, the combination comprising a supporting frame member, a plurality of push buttons movably carried by said frame member for movement relative thereto between predetermined positions, a carriage plate resiliently supported on said frame member for yieldable movement in a direction away from said push buttons, a plurality of bar elements slidably disposed on said carriage plate for reciprocal movement in directions transverse to the movement of said push buttons, interengaging means between said push buttons and said bar elements for retaining said push buttons in one position, a plurality of pneumatic actuators for said bar elements being operative to move said bar elements and cause separation of said interengaging means whereby said push buttons are released from said one position, latching bar means disposed on said frame member for reciprocal movement in directions transverse to the movement of said push buttons, operating means for said carriage plate being operatively connected to said latching bar means whereby movement of said latching bar means causes yieldable movement of said carriage plate, cam means movable by said push buttons into engagement with said latching bar means for moving the same whereby said interengaging means are released in response to movement of said push buttons, and notch means on said push buttons engaging said latching bar means for retaining said push buttons in another position.

9. In a selector mechanism for selectively controlling electric and pneumatic circuits, the combination comprising a supporting frame, pneumatic valve means on said frame, electric switch means on said frame, a carriage plate resiliently supported on said frame for yieldable vertical movement, a plurality of push buttons carried by said frame and being movable between retracted, intermediate and depressed positions, resilient means biasing each push button to a retracted position, a plurality of tabs depending from each push button, a plurality of bars slidably mounted on said carriage plate, a plurality of latching fingers on each bar disposed for engagement with at least one tab on each push button for retaining a selected push button in the depressed position, pneumatic actuating means for sliding said bars on said carriage plate whereby said latching fingers are disengaged from said tabs and the selected push button is biased to an intermediate position, latching means movably mounted on said frame and being operatively connected to each push button for movement to an unlatching position when a selected push button is being depressed, a notched portion on each push button engaging said latching means whereby the selected push button is retained in the intermediate position, valve and switch actuating means operatively carried by said frame, and cam means on each push button for operating said valve and switch actuating means.

10. The combination as recited in claim 9 wherein said latching means includes a latching bar, a carriage plate depressing bar and cam means therebetween whereby operation of said latching bar depresses said carriage plate and displaces said latching fingers on each bar from the tabs on each push button.

11. In an automatic control system, the combination comprising a plurality of pneumatically operated control devices adapted to be operated in a predetermined sequence defined by a selected cycle of operation, programmer means movable at a rapid rate during a cycle searching operation and at a slower rate during a controlling operation defining the selected cycle of operation for said control devices, a selector mechanism having a plurality of selection buttons corresponding to the number of operation cycles, latching means positioned by a selector button for holding the same in a latched position whereby said programmer means rapidly searches a selected cycle, pneumatic means operatively connected between said programmer means and said latching means for repositioning the same upon completion of the searching operation, and pneumatic release means operatively connected between said programmer means and said latching means for releasing the same upon completion of the controlling operation.

References Cited by the Examiner

UNITED STATES PATENTS

| | | | |
|---|---|---|---|
| 2,457,874 | 1/1949 | Davis | 60—60 |
| 2,678,063 | 5/1954 | Ellis | 137—631 |
| 2,914,629 | 11/1959 | D'Aprile | 200—61.86 |
| 2,960,856 | 11/1960 | Bauerlein et al. | 68—12 |
| 2,967,546 | 1/1961 | Sisson | 137—624.2 |
| 3,123,976 | 3/1964 | Mansell | 60—60 |

EDGAR W. GEOGHEGAN, *Primary Examiner.*

ROBERT K. SCHAEFER, *Examiner.*

B. DOBECK, *Assistant Examiner.*